United States Patent [19]

Höfler et al.

[11] Patent Number: 4,903,576
[45] Date of Patent: Feb. 27, 1990

[54] SOLENOID-CONTROLLED VALVE ARRANGEMENT

[75] Inventors: Siegfried Höfler, Hanover; Johannes Möller, Wennigsen; Erwin Petersen, Wunstorf; Johann Rothen, Sarstedt, all of Fed. Rep. of Germany

[73] Assignee: Wabco Westinghouse Fahrzeugbremsen GmbH, Hanover, Fed. Rep. of Germany

[21] Appl. No.: 235,409

[22] Filed: Aug. 22, 1988

[30] Foreign Application Priority Data

Sep. 12, 1987 [DE] Fed. Rep. of Germany ....... 3730779

[51] Int. Cl.[4] .......................................... F15B 13/043
[52] U.S. Cl. .................................. 91/459; 137/627.5; 303/119
[58] Field of Search ...................... 137/627.5; 303/118, 303/119; 91/459

[56] References Cited

U.S. PATENT DOCUMENTS

| 3,826,542 | 7/1974 | Peruglia | 303/119 |
| 3,857,615 | 12/1974 | Acar | 137/625.5 X |
| 4,025,127 | 5/1977 | Rembold | 303/119 X |
| 4,050,743 | 9/1977 | Knight | 303/118 X |
| 4,576,416 | 3/1986 | Muller et al. | 303/119 X |

FOREIGN PATENT DOCUMENTS

| 157944 | 10/1985 | European Pat. Off. . | |
| 2311930 | 9/1974 | Fed. Rep. of Germany | 303/119 |
| 2403675 | 7/1975 | Fed. Rep. of Germany . | |
| 2224180 | 8/1976 | Fed. Rep. of Germany . | |
| 3038802 | 5/1982 | Fed. Rep. of Germany . | |
| 3240277 | 5/1984 | Fed. Rep. of Germany . | |

Primary Examiner—Gerald A. Michalsky
Attorney, Agent, or Firm—James O. Ray, Jr.

[57] ABSTRACT

A solenoid-controlled valve arrangement is provided which includes a relay valve having in its control line a series arrangement of a shut-off valve and a shifting valve. Each of the shut-off valve and the shifting valve is solenoid-controlled.

33 Claims, 1 Drawing Sheet

SOLENOID-CONTROLLED VALVE ARRANGEMENT

FIELD OF THE INVENTION

The present invention relates, in general, to solenoid-controlled valves and, more particularly, this invention relates to a solenoid-controlled valve arrangement in which the pressure application at the user is controlled by a valve arrangement located behind the pressure source.

BACKGROUND OF THE INVENTION

Prior to the present invention, a valve arrangement of this general type has been taught in the prior art. See, for example, German publication DE No. 22 24 180 B2. This publication describes a solenoid-controlled inlet valve, indicated as 2, and a solenoid-controlled outlet valve, indicated as 3. The inlet valve 2 is closed by energizing the magnet, indicated as 12, of such solenoid-controlled inlet valve 2, and the solenoid-controlled outlet valve 3 is opened by energizing its solenoid magnet, indicated as 13. In this prior art arrangement, the solenoid-controlled inlet valve 2 opens and the solenoid-controlled outlet valve 3 closes in the pressurizing position, thus solenoid magnets 12 and 13 are deenergized. In the pressure-holding position, however, both the solenoid-controlled inlet valve 2 and the solenoid-controlled outlet valve 3 are closed. Therefore, the first solenoid magnet 12 is energized. On the other hand, in the pressure-release position of this prior art valve arrangement, the inlet valve 2 is closed and the outlet valve 3 is open. In this case, both valve solenoid magnets 12 and 13 are energized at the same point in time.

In contrast to the present invention, the above-described simultaneous energizing of both solenoid magnets 12 and 13, as required in this valve arrangement in the pressure-release position, and the corresponding doubling of the power requirement constitutes a significant disadvantage.

SUMMARY OF THE INVENTION

The present invention provides a solenoid-controlled valve arrangement that is positioned behind a pressure source to control the pressure input to a pressure user. In this arrangement, the solenoid-controlled valve will admit pressure at a predetermined rate while in the pressure-increase position, and when in a pressure-holding position, such solenoid-controlled valve will block the pressure medium supply to the user unit. In the pressure-decreasing position, such solenoid-controlled valve allows return of the pressure medium to its source when such pressure medium is hydraulic medium. The solenoid-controlled valve connects the user with an overpressure-free pressure release area when such pressure medium is compressed air. Such solenoid-controlled valve arrangement includes a relay valve having a control line and an operating exit port connected to the pressure supply line of the user. In the control line of the relay valve, a solenoid-controlled shut-off valve and a solenoid-controlled shifting valve are located in series. When the solenoid magnet of the shifting valve is energized, it will also block the control line and connect the pressure-release area with a part of the shifting valve located downstream.

OBJECTS OF THE INVENTION

It is, therefore, one of the primary objects of the present invention to provide a solenoid-controlled valve arrangement which can operate effectively without requiring simultaneous energization of two magnets.

Another object of the present invention is to provide a solenoid-controlled valve arrangement which can be utilized with any pressure medium.

Still another object of the present invention is to provide a solenoid-controlled valve arrangement which can be applied to a number of systems and pressure users.

Yet another object of the present invention is to provide a solenoid-controlled valve arrangement which is particularly useful in a trailer braking system of a tractor-trailer combination.

A further object of the present invention is to provide a solenoid-controlled valve arrangement which enables the use of a more cost-efficient electrical control system.

In addition to the above-described objects and advantages of the solenoid-controlled valve arrangement of the present invention, various other objects and advantages of the invention will become more readily apparent to those persons skilled in the valve art from the following more detailed description, when such description is taken in conjunction with the attached drawing FIGURES and the appended claims.

BRIEF DESCRIPTION OF THE INVENTION

Figure 1:
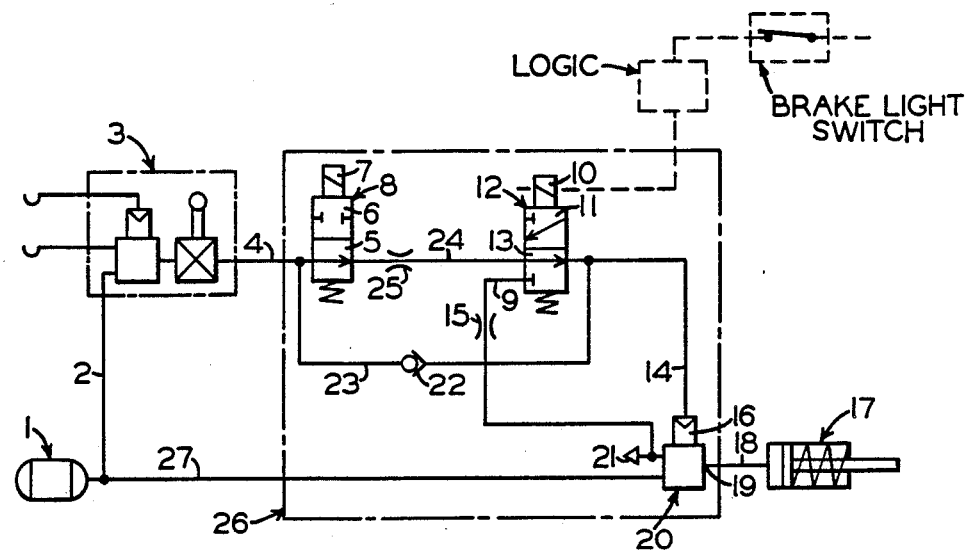
FIG. 1 is a schematic illustration of one presently preferred solenoid-controlled valve arrangement as it applies to a brake system.

Although the invention can be practiced with any suitable pressure medium, it will be described below with compressed air being used. If, for example, hydraulic fluid were to be used as the pressure medium, then normally, such fluid collected in the release chamber would be returned to the pressure source, i.e., it would be brought up to storage pressure. On the other hand, when compressed air is used as the pressure medium, the atmosphere can be used advantageously as the pressure-release space.

Even though the description of the invention, which follows, is particularly directed to the use of the solenoid-controlled valve arrangement in a vehicle design, it is obvious that such arrangement can also be used and applied in and to other systems and users where the same problems are likely to be encountered.

In addition, it should be noted that identical components having identical functions have been identified with identical reference numerals in each of the drawing FIGURES.

Now, refer more particularly to FIG. 1 which illustrates a valve arrangement, generally designated 26. This valve 26 is located behind a pressure source 3 and consists of a relay valve, generally designated 20, a solenoid-controlled shut-off valve, generally designated 8, and a solenoid-controlled shifting valve, generally designated 12.

The relay valve 20, at its exit port 19, is connected with a brake cylinder 17 by way of a pressure communication line 18. This arrangement could, if desired, be used for multiple cylinders. The relay valve 20 is connected to the brake cylinder 17 by means of a pressure line 18, a pressure storage line 27 that is connected with a pressure medium source 1, or by way of a pressure-release 21 with the atmosphere.

The control element 16 of the relay valve 20 is connected with a control line 4, 24, 14. The pressure source 3 is located up front and, depending on control design, connected with the pressure storage line 2, the pressure source 1, or the atmosphere.

The shut-off valve 8 and the shifting valve 12 are located in the control line 4, 24, 14 in such a manner that the shut-off valve 8 is upstream from the shifting valve 12.

The brake pressure source, generally designated 3, is illustrated as a combination of a load-dependent braking force regulator and a trailer brake valve. Both of these components are standard designs and are, therefore, not described in any greater detail here. The present invention can, however, be used for other installations of this type.

The shut-off valve 8 has a first position 5 and a second position 6. In the first position 5, which is incurred with a deenergized solenoid magnet 7, the shut-off valve 8 releases the control line 4, 24, 14. In the second position 6, which is incurred by energizing the solenoid magnet 7, the shut-off valve 8 will block the control line 4, 24, 14.

The shifting valve 12 also has a first position 13 and a second position 11. In the first position 13, which is incurred at a deenergized solenoid magnet 10, the shifting valve 12 will block the control line 4, 24, 14 and connect the downstream portion 14 of the control line 4, 24, 14" and thus the control device 16 of the relay valve 20 with the atmosphere.

The return of the shut-off valve 8 and the shifting valve 12 into the respective first position 5 or 13 is preferably accomplished by springs. This return can, nevertheless, be attained by other means, such as by storage pressure.

The valve unit 26, according to its above-described design, functions as follows:

During normal operation, the solenoid magnets 7 and 10 are deenergized and the control line 4, 24, 14 is open. In this pressure-increase position, a braking pressure from the source 3 is conducted to the control unit 16 of the relay valve 20, and from there to the brake cylinder 17 by way of the pressure communication line 18.

From the pressure-increase position, the valve 26 can be adjusted by energizing the solenoid magnet 7 of the shut-off valve 8 into a pressure-holding position. In this position, a braking pressure initiated by the pressure source 3 and, as a consequence, of a shut-off of the control line 4, 24, 14, cannot reach the control unit 16 of the relay valve 20. This pressure-holding position results in a situation where in the brake cylinder 17 no braking pressure can be built up or the existing pressure cannot be increased.

From the pressure-increase position, the valve 26 can be adjusted by energizing the solenoid magnet 10. From the pressure-holding position, into the pressure-decrease position, the valve 26 can be adjusted by excitation of the magnet 10 and simultaneous deactivation of the solenoid magnet 7. In the pressure-decrease position, the control line 4, 24, 14 is blocked by the shifting valve 12 while, at the same time, the downstream portion 14 of the control line 4, 24, 14 connected to the shifting valve 12 and thus the control unit 16 of the relay valve 20 will be connected with the atmosphere. As a consequence of the resulting control pressure-drop, the relay valve 20 will cause a respective pressure-decrease in the pressure line 18, thus causing a drop of braking pressure in the brake cylinder 17.

The valve 26 can also be adjusted by energizing one of the solenoid magnets 7 or 10 between the pressure-increase, pressure-holding, and the pressure-decrease position.

The possibility of solenoid-adjustability can be utilized by means of customary methods used for protecting the brake cylinder 17 at the vehicle wheel against locking.

In addition to the described method, the embodiment illustrated also gives a design for a reducer unit 25 mounted adjacent the shut-off valve 8, as well as a reducer unit 15 mounted adjacent the shifting valve 12, which constitutes pressure-release setup 9. The reducer units 25 and 15 can be considered as separate units, such as, throttle valves, or they can be used to demonstrate that the shut-off valve 8 and/or the shifting valve 12, in regard to the respective flow resistance, were designed for a minimum decleration (in time) of the braking pressure in the brake cylinder 17 in relation to the control pressure produced by the relay valve 20.

The embodiment shows also a one-way by-pass line 23, 22, which bridges the shut-off valve 8 and the shifting valve 12 in the direction of the flow to the braking pressure source 3. The one-way action of this line is assured by a backup valve 22, which blocks the flow from the pressure source 3 to the control connection 16 of the relay valve 20, whereupon the flow is released in the opposite direction.

The embodiment also shows that the pressure-release setup 9 of the shifting valve 12 is connected with the pressure-release 21 of the relay valve 20.

The solenoid magnet 10 for the shifting valve 12 can also be mounted in the above-described manner with a brake light switch in the vehicle.

No specific description has been added for the last four design examples.

Shown is also a dotted outline, which combines all entities together into one unit, especially for a compact and cost-effective method of design of the relay valve 20, the shut-off valve 8, the shifting valve 12, the connecting components 24 and 14 for the control line 4, 24, 14, together with the one-way by-pass line 23, 22, the reducer units 25 and 15, and the connecting lines for the pressure release units 9 of the shifting valve 12 and 21 of the relay valve 20, all of which are combined into one constructional valve unit 26. It is obvious, that such constructional valve unit 26 may not be comprised of all of the above entities, and that some items may comprise a separate unit, and that the total unit may be comprised of several units.

Figure 2:
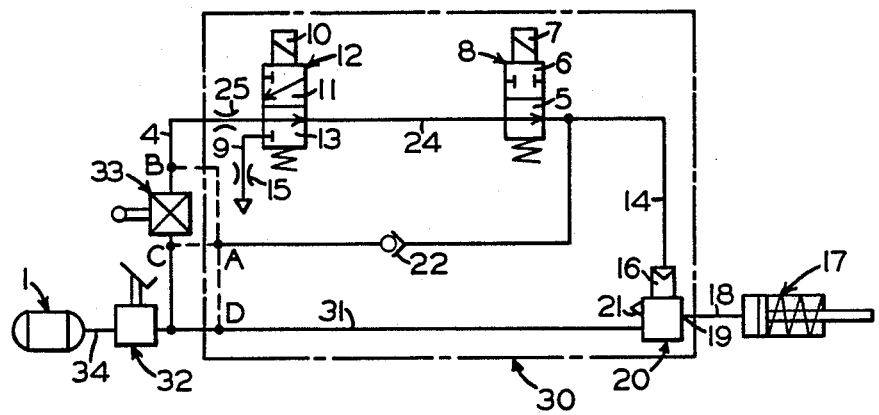
FIG. 2 is a schematic illustration of another solenoid-controlled valve arrangement as it applies to a different brake system.

The design embodiment illustrated in FIG. 2 is similar to that shown in FIG. 1, except as described below:

The location of the shut-off valve 8 and of the shifting valve 12 within the control line 4, 24, 14 are reversed, whereby the shut-off valve 8 is downstream of shifting valve 12.

The pressure source is shown connected to a combination of a tractor brake valve 32 and a load-dependent braking force regulator 33, both of conventional design, and therefore not described in any greater detail here, but any other type of pressure source may be considered.

The pressure source activates the tractor brake valve 32 first before entering the storage line 31 for relay valve 20 and braking force regulator 33 for control line 4, 24, 14. At the storage side, the braking force regulator 33 is connected to the exit of the tractor brake valve 32 which, in turn, is connected over line 34 with a pressure medium source 1.

It is obvious that the tractor brake valve 32 and the braking force regulator 33 can be combined into one unit, as shown in the previous embodiment. The trailer brake valve can also be used as shown in the previous embodiment, with the tractor brake valve acting as the pressure source.

The reducer valve 25 of the shut-off valve 8 is located upstream of the shifting valve 12. This arrangement has the advantage that in the pressure-reduction position, the reducer valve 25 is not located midway between the control unit 16 of the relay valve 20 and the pressure-reduction exit 9 of the shifting valve 12, thus delaying the pressure-decrease of the control unit 16.

A comparison of the above embodiments, according to FIG. 1 and FIG. 2, shows for the first embodiment, the advantage that the pressure-release of the control unit 16 in the pressure-release position moves directly by way of the pressure-release unit 9 of the shifting valve 12 and not, as shown in FIG. 2, by placing the shut-off valve 8 in between.

The dotted line shows that the valve arrangement can be combined into single unit 30.

a

The explanations given for FIG. 1 are also valid for FIG. 2, as well as those given for the above example.

In general, any unit can be used as a pressure source for the different embodiments, if such unit can produce a stepped-up brake pressure. In this case, the brake system examples are referred to within the context of a tractor brake valve, a trailer brake valve, and a pressure source which can be controlled by electrical signals, such as in an electrically-controlled braking system. A pressure source can also be a combination of the above-named units with a load determined braking force controller and/or a relay valve.

For a trailer, which is normally supplied by means of plug-in type connectors and long cables from the electric source of the tractor, the load limitations of the plug-in connections and the power losses incurred because of the long lines make the question of power requirements of prime importance, especially when trailer trains consist of several trailers, as is the case in many countries. A special application for this invention, therefore, is the trailer braking system.

The invention makes it possible also to design a lower load and thus a more cost-efficient electrical control system, as they are used with anti-lock vehicle brakes and trailer braking systems.

The application of a relay valve as envisioned by the invention can, however, cause problems in anti-lock vehicle brakes. Such problems will occur only when braking pressure is delayed in traditional relay valves in at least one brake cylinder. The problem is caused by the pressure medium volumes during braking and the pressure medium lines between the brake cylinder and the relay valve, which causes a lower volume in the control mechanism and the control line of the relay valve. We assume that the valve is in the pressure build-up position. At a given brake pressure, the control will signal to hold pressure, which stops the rise of the control pressure, while the braking pressure in the brake cylinder will continue to rise until it equals the control pressure. But this pressure-increase in the brake cylinder can lead to undesirable slip of the respective vehicle wheel, or to an unintentional shifting of the valve into the pressure-release position. A reaction will occur in the brake cylinder during pressure-release as a consequence of the delay in the brake pressure. As a consequence, the vehicle wheel will be insufficiently braked, as the medium pressure increases. The invention provides a solution, when the pressure resistance of the shut-off valve and of the shifting valve restricts the flow and, as explained above, is readjusted to the volume of the brake cylinder and the flow resistance of the pressure medium line. For a further development, as explained above, reducer valves can be used for the adjustment of the flow resistance. This adjustment of the flow resistance can be initiated at the shut-off valve as well as at the shifting valve with varying success, e.g., various flow cross-sections, as the deceleration of the braking pressure in the brake cylinder during pressure-decrease is less than during pressure-increase. This is caused by the shorter path and larger cross-section for the pressure-release, as compared with the pressure-increase.

In cases where the valve with an adjusted flow resistance for the shut-off and/or the shifting valve is used alternately for multiple brake cylinders with various pressure volumes received during braking, it is advisable to adjust the volume for the largest possible volume received. This may impede the time relationship for smaller pressure media, as compared with a design without the flow resistance adjustment, i.e., adjusted to suit the time relationship for the largest volume received by the armature, but this drawback will be compensated for by the advantage of a substantially more uniform design for the valve units.

When the brake pressure source in the control line is located behind the shut-off valve and the shifting valve in the direction of the flow, a by-pass of the latter, by way of a single by-pass line in a flow direction to the brake pressure source, has the advantage that during a pressure relief during brake action, the relief of the control system for the relay valve need not go by way of the shut-off valve or the shifting valve, which has the result of a rapid release effect of the brake cylinder. This is especially true when the flow resistance of the shut-off and/or shifting valve has been adjusted, as described above. It is advantageous, in this case, that a pressure-release by way of a pressure source is possible in any position of the shut-off valve or the shifting valve.

A different rapid release effect can be obtained when the solenoid magnet for the shifting valve is connected to the brake light switch in such a way that it will be activated by impulse (or time related). The control system of the relay valve is pressure-released over the short path of the shifting valve instead of the total length of the control line.

In the embodiment illustrated, protection against dirt and other contaminants, as well as a simple noise damping system, can be obtained when the pressure-release of the shifting valve acts in conjunction with the pressure-release system of the relay valve.

While a number of embodiments of the solenoid-controlled valve arrangement of the present invention have been shown in the drawings and described in detail above, it should be obvious to those persons skilled in the valve art that various other modifications and adaptations of the present invention can be made without departing from the spirit and scope of the attached claims.

We claim:

1. A solenoid-controlled valve arrangement for use in a brake system equipped with a skid-protection system, said solenoid-controlled valve arrangement being connected behind a fluid pressure control means for controlling a pressure input to at least one brake actuator, said solenoid-controlled valve arrangement comprising:
   (a) a relay valve having a control line and an operating exit port connected to a fluid pressure supply line of such at least one brake actuator;
   (b) a solenoid-controlled shifting valve positioned in said control line, said solenoid-controlled shifting valve having an energizable magnet, said solenoid-controlled shifting valve blocking said control line and connecting a portion of said control line which is located downstream of said solenoid-controlled shifting valve with an overpressure-free pressure release area when said energizable magnet is energized;
   (c) a solenoid-controlled shut-off valve positioned in said control line of said relay valve upstream of said solenoid-controlled shifting valve, said solenoid-controlled shut-off valve having an energizable magnet, said solenoid-controlled shut-off valve blocking said control line when said energizable magnet is energized; and
   (d) a one-way by-pass line having a first end thereof connected ahead of said solenoid-controlled shut-off valve and a second end thereof connected behind said solenoid-controlled shifting valve for by-passing each of said solenoid-controlled shifting valve and said solenoid-controlled shut-off valve on a direction of a flow of said fluid pressure to said fluid pressure control means.

2. A solenoid-controlled valve arrangement, according to claim 1, wherein the fluid pressure is compressed air and said overpressure-free pressure release area is connected to atmosphere.

3. A solenoid-controlled valve arrangement, according to claim 2, wherein said fluid pressure control means is located upstream of said control line for said relay valve.

4. A solenoid-controlled valve arrangement, according to claim 2, wherein said fluid pressure control means is located upstream of a storage line for said relay valve.

5. A solenoid-controlled valve arrangement, according to claim 2, wherein said solenoid-controlled shifting valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared with said control pressure of said relay valve, is one of no larger and not much larger than absolutely necessary for a full opening of said relay valve.

6. A solenoid-controlled valve arrangement, according to claim 5, wherein said solenoid-controlled valve arrangement further includes a reducer means for adjusting said flow resistance of said solenoid-controlled shifting valve.

7. A solenoid-controlled valve arrangement, according to claim 1, wherein said fluid pressure control means is located upstream of said control line for said relay valve.

8. A solenoid-controlled valve arrangement, according to claim 7, wherein said solenoid-controlled shut-off valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared to a control pressure of said relay valve, is one of no larger and not much larger than is absolutely necessary for a full opening of said relay valve.

9. A solenoid-controlled valve arrangement, according to claim 8, wherein said solenoid-controlled valve arrangement further includes a reducer means for adjusting said flow resistance of said solenoid-controlled shut-off valve.

10. A solenoid-controlled valve arrangement, according to claim 7, wherein said reducer means which acts in conjunction with said solenoid-controlled shut-off valve is positioned upstream of said solenoid-controlled shifting valve.

11. A solenoid-controlled valve arrangement, according to claim 7, wherein said solenoid-controlled shifting valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared with said control pressure of said relay valve, is one of no larger and not much larger than absolutely necessary for a full opening of said relay valve.

12. A solenoid-controlled valve arrangement, according to claim 11, wherein said solenoid-controlled valve arrangement further includes a reducer means for adjusting said flow resistance of said solenoid-controlled shifting valve.

13. A solenoid-controlled valve arrangement, according to claim 1, wherein said fluid pressure control means is located upstream of a storage line for said relay valve.

14. A solenoid-controlled valve arrangement, according to claim 13, wherein said solenoid-controlled shut-off valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared to a control pressure of said relay valve, is one of no larger and not much larger than is absolutely necessary for a full opening of said relay valve.

15. A solenoid-controlled valve arrangement, according to claim 14, wherein said solenoid-controlled valve arrangement further includes a reducer means for adjusting said flow resistance of said solenoid-controlled shut-off valve.

16. A solenoid-controlled valve arrangement, according to claim 15, wherein said reducer means which acts in conjunction with said solenoid-controlled shut-off valve is positioned upstream of said solenoid-controlled shifting valve.

17. A solenoid-controlled valve arrangement, according to claim 13, wherein said solenoid-controlled shifting valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared with said control pressure of said relay valve, is one of no larger and not much larger than absolutely necessary for a full opening of said relay valve.

18. A solenoid-controlled valve arrangement, according to claim 17, wherein said solenoid-controlled valve arrangement further includes a reducer means for adjusting said flow resistance of said solenoid-controlled shifting valve.

19. A solenoid-controlled valve arrangement, according to claim 1, wherein said solenoid-controlled shut-off valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared to a control pressure of said relay valve, is one of no larger and not much larger than is absolutely necessary for a full opening of said relay valve.

20. A solenoid-controlled valve arrangement, according to claim 19, wherein said solenoid-controlled valve arrangement further includes a reducer means for adjusting said flow resistance of said solenoid-controlled shut-off valve.

21. A solenoid-controlled valve arrangement, according to claim 20, wherein said reducer means which acts in conjunction with said solenoid-controlled shut-off valve is positioned upstream of said solenoid-controlled shifting valve.

22. A solenoid-controlled valve arrangement, according to claim 19, wherein said solenoid-controlled shifting valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared with said control pressure of said relay valve, is one of no larger and not much larger than absolutely necessary for a full opening of said relay valve.

23. A solenoid-controlled valve arrangement, according to claim 22, wherein said solenoid-controlled valve arrangement further includes a reducer means for adjusting said flow resistance of said solenoid-controlled shifting valve.

24. A solenoid-controlled valve arrangement, according to claim 1, wherein said solenoid-controlled shifting valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared with said control pressure of said relay valve, is one of no larger and not much larger than absolutely necessary for a full opening of said relay valve.

25. A solenoid-controlled valve arrangement, according to claim 24, wherein said solenoid-controlled valve arrangement further includes a reducer means for adjusting said flow resistance of said solenoid-controlled shifting valve.

26. A solenoid-controlled valve arrangement, according to claim 1, wherein said energizable magnet of said solenoid-controlled shifting valve is connected to a brake light switch in a manner such that said energizable magnet of said solenoid-controlled shifting valve will at least be energized by electrical impulses when said brake light switch is opened.

27. A solenoid-controlled valve arrangement, according to claim 1, wherein a pressure-release unit of said solenoid-controlled shifting valve is merged with a pressure-release unit of said relay valve.

28. A solenoid-controlled valve arrangement, according to claim 1, wherein said relay valve and said solenoid-operated shut-off valve and said solenoid-operated shifting valve in combination with each connecting component of said control line are combined into a single unit.

29. A solenoid-controlled valve arrangement, according to claim 28, wherein said single unit further includes at least reducer means for adjusting a flow resistance of said solenoid-controlled shifting valve and at least one reducer means for adjusting a flow resistance of said solenoid-controlled shut-off valve.

30. A solenoid-controlled valve arrangement, according to claim 29, wherein said single unit further includes said one-way by-pass line in said direction of said flow to said fluid pressure control means.

31. A solenoid-controlled valve arrangement, according to claim 1, wherein said solenoid-controlled shut-off valve includes a flow resistance means which is positioned in a manner such that during operation a delay of said pressure in such at least one brake actuator as a consequence of a volume absorbed by such at least one brake actuator and a flow resistance means positioned in said fluid pressure supply line of such at least one brake actuator, as compared to a control pressure of said relay valve, is one of no larger and not much larger than is absolutely necessary for a full opening of said relay valve.

32. A solenoid-controlled valve arrangement, according to claim 31, wherein said solenoid-controlled valve arrangement further includes a reducer means for adjusting said flow resistance of said solenoid-controlled shut-off valve.

33. A solenoid-controlled valve arrangement, according to claim 32, wherein said reducer means which acts in conjunction with said solenoid-controlled shut-off valve is positioned upstream of said solenoid-controlled shifting valve.

* * * * *